No. 651,408. Patented June 12, 1900.
E. E. ZIEGLER.
BACK PEDALING BRAKE.
(Application filed May 25, 1899.)
(No Model.)

WITNESSES:
A. V. Groupe
Harry E. Dimmon

INVENTOR
Edward E. Ziegler
by
David S. Williams
Attorney.

THE NORRIS PETERS CO., PHOTO-LITHO., WASHINGTON, D. C.

UNITED STATES PATENT OFFICE.

EDWARD E. ZIEGLER, OF PHILADELPHIA, PENNSYLVANIA.

BACK-PEDALING BRAKE.

SPECIFICATION forming part of Letters Patent No. 651,408, dated June 12, 1900.

Application filed May 25, 1899. Serial No. 718,165. (No model.)

*To all whom it may concern:*

Be it known that I, EDWARD E. ZIEGLER, a citizen of the United States of America, and a resident of Philadelphia, in the county of Philadelphia, State of Pennsylvania, have invented certain new and useful Improvements in Brakes for Bicycles and other Vehicles, of which the following is a specification.

My invention relates to improvements in pedal-brakes for bicycles and other vehicles; and the object is to provide the rear hub of a bicycle-wheel with a device by which sufficient frictional resistance will be produced to check the motion of the machine by reversing the motion of the sprocket-wheel through the medium of the pedals and driving-chain or other intermediate gearing.

My invention will be more fully understood by referring to the accompanying drawings, in which—

Figure 1:
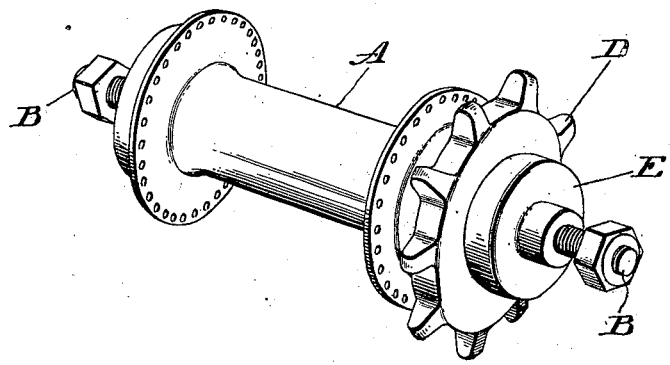
Figure 2:
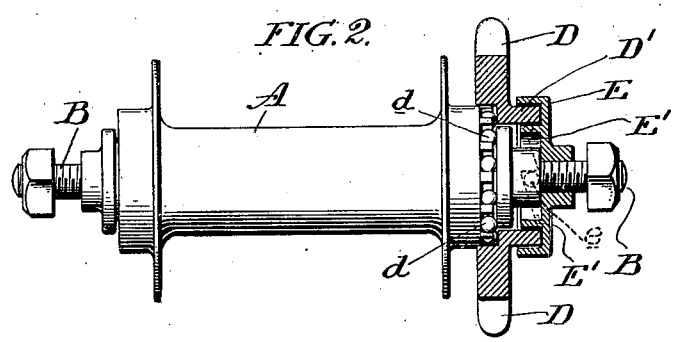
Figure 3:
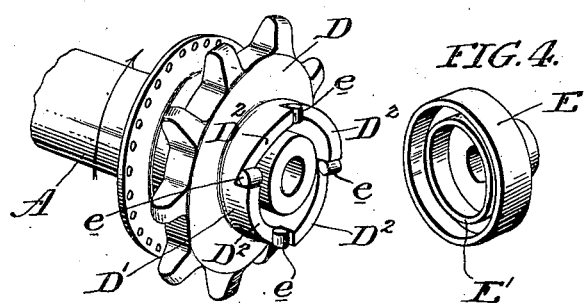
Figure 4:
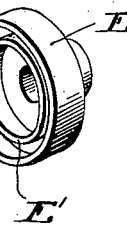
Figure 5:
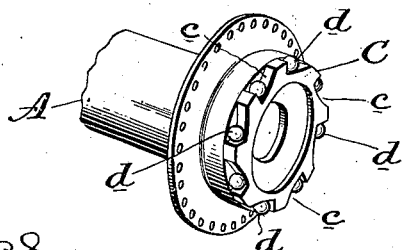

Figure 1 illustrates a perspective view of the rear hub and sprocket-wheel of a bicycle in which are located the devices forming the subject-matter of my invention. Fig. 2 represents a side elevation of the hub with the sprocket-wheel and parts adjacent in section. Fig. 3 shows a perspective view of a portion of the hub and sprocket-wheel, with the rollers adapted to the inclines on the hub of the sprocket-wheel. Fig. 4 illustrates a perspective view of the cup which incloses the inclines of the sprocket-wheel and forms an outer bearing for the rollers, and Fig. 5 represents a perspective view of a portion of the hub which is provided with circumferential inclines adapted to the balls which engage the sprocket-wheel and turn the hub when the bicycle is being driven forward.

Referring to the letters of the drawings, A represents the hub of the driving-wheel, and B the fixed shaft, upon which the hub is rotated. These parts are of the usual construction, being provided with the ball-bearings commonly used in the construction of bicycles. On one end of the hub A is formed a ring C, having a series of circumferential inclines $c$ for the reception of a series of balls $d$. The sprocket-wheel D fits over the ring C and forms an outer bearing for the balls $d$, and when driven in the direction of the arrow shown in Fig. 3 the sprocket-wheel causes the balls to travel up the inclines $c$ and creates a frictional connection between the ring C and sprocket-wheel D when the machine is being driven forward; but if the sprocket-wheel is held stationary and the hub revolves in the direction of the arrow the balls will be released from the sprocket-wheel and the hub will be free and may revolve independently. On the outer end of the sprocket-wheel D is a hub D', in which are formed a number of inclines $D^2$, made to receive rollers $e$, which are held in position and have an outer bearing in a cup E, which fits over the hub D'. The cup E is secured to the shaft B and has an inner ring E', which serves, in conjunction with the outer edge of the cup, to form a race or guide way for the rollers $e$.

When the machine is being driven forward and the sprocket-wheel is revolving in the direction of the arrow shown in Fig. 3, the rollers $e$ will freely revolve between the inclines of the sprocket-wheel and the race formed in the cup E; but if the sprocket-wheel is moved in an opposite direction the rollers will move up the inclines and wedge themselves between the same and the cup, thus causing the sprocket-wheel to bear hard against the balls $d$, which being interposed between the sprocket-wheel and the end of the hub A cause sufficient friction to check the motion of the hub.

Having described my invention, what I claim, and desire to secure by Letters Patent, is—

1. A device of the character specified, comprising a wheel-hub provided at one end with circumferential inclines, balls adapted to said inclines, a sprocket-wheel forming on one side a bearing for said balls and having a hub formed upon the opposite side provided with oppositely-arranged inclines, a cup inclosing the inclined portion of the hub and rollers interposed between the cup and hub and adapted to said inclines.

2. A device of the character specified comprising in combination with a wheel and hub thereof a sprocket-wheel or other driving mechanism in contact with the hub, ratchet-teeth formed on said hub, balls adapted to the incline between the ratchet-teeth and interposed between the hub and sprocket-wheel, a supporting-shaft, a cup or disk mounted thereon, oppositely-arranged ratchet-teeth on the sprocket-wheel, rollers between the cup and sprocket-wheel, and adapted to the inclines of the sprocket-teeth to cause frictional resistance between the driving mechanism and the wheel-hub, when the driving mechanism is turned in a reverse direction.

3. A device of the character specified comprising a fixed shaft, a wheel mounted thereon having a hub provided on one end with a series of inclines, a sprocket-wheel, balls adapted to said inclines and interposed between the hub and sprocket-wheel oppositely-arranged inclines formed upon the sprocket-wheel, a cup mounted upon the fixed shaft having inner and outer rings inclosing said inclines, and rollers interposed between the cup and sprocket-wheel substantially as shown and described.

4. A pedal-brake for bicycles and other vehicles comprising a fixed shaft, a cup threaded thereon, a sprocket-wheel, provided with inclined sockets, rollers arranged between the cup and sprocket-wheel, a wheel-hub provided with oppositely-arranged inclined sockets, balls between the same and the sprocket-wheel, the arrangement being such as to cause frictional resistance between the fixed and movable parts of the device when the sprocket-wheel is moved in a reverse direction.

5. A pedal-brake for bicycles and other vehicles comprising a wheel having a hub provided with a number of inclined surfaces forming seats for the reception of balls, balls of greater diameter than the width of the seats adapted thereto, a sprocket-wheel mounted upon said hub provided with oppositely-arranged inclines, balls between the hub and sprocket-wheel, a fixed central shaft, supporting the hub, a cup secured to said shaft against turning and rollers between the cup and the inclines upon the end of the sprocket-wheel.

6. A pedal-brake comprising in combination with a driving-wheel and hub, the latter being provided with a series of inclines forming seats, balls in said seats of substantially-larger diameter than the width of the seats, a sprocket-wheel countersunk so as to receive the hub and form an outer seat for the balls, a hub D', on the sprocket-wheel having oppositely-arranged inclines, $D^2$, a fixed cup, E, and rollers, $e$, between the sprocket-wheel and cup.

7. A pedal-brake comprising a sprocket-wheel having the inclines $D^2$, the cup E, and rollers $e$, between the cup and sprocket-wheel, a wheel-hub having the inclines $c$, and the balls $d$, adapted to said inclines.

Signed by me at Philadelphia, Pennsylvania, this 17th day of May, 1899.

EDW. E. ZIEGLER.

Witnesses:
ANDREW V. GROUPE,
DAVID S. WILLIAMS.